Jan. 19, 1954  G. W. HOPKINS ET AL  2,666,580
DIVIDEND-DIVISOR ALIGNING MECHANISM
Filed Jan. 26, 1951  8 Sheets-Sheet 1
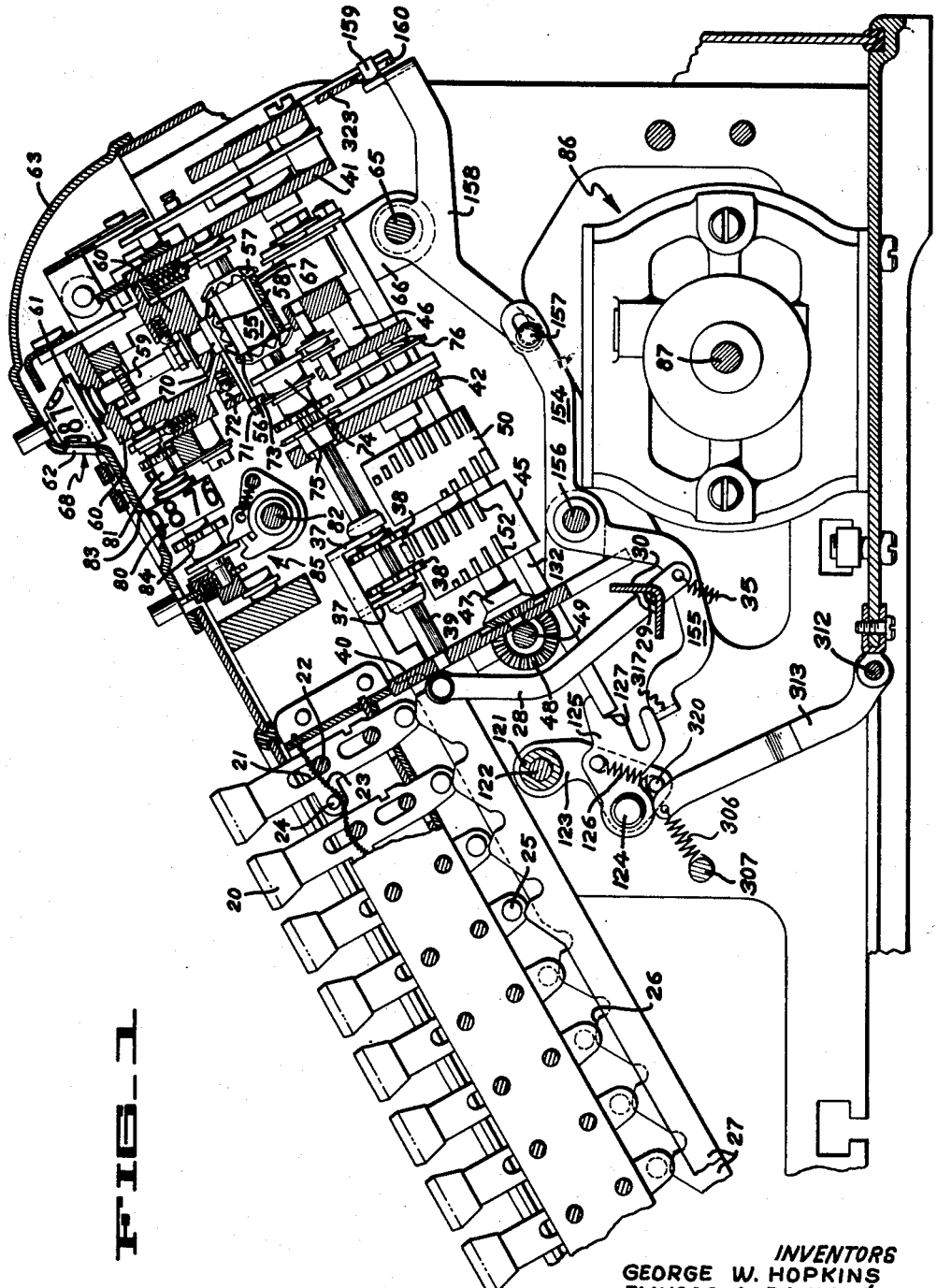
INVENTORS
GEORGE W. HOPKINS
ELWOOD A. DAVIS &
GOTTFRIED ZICKLER
BY
ATTORNEY

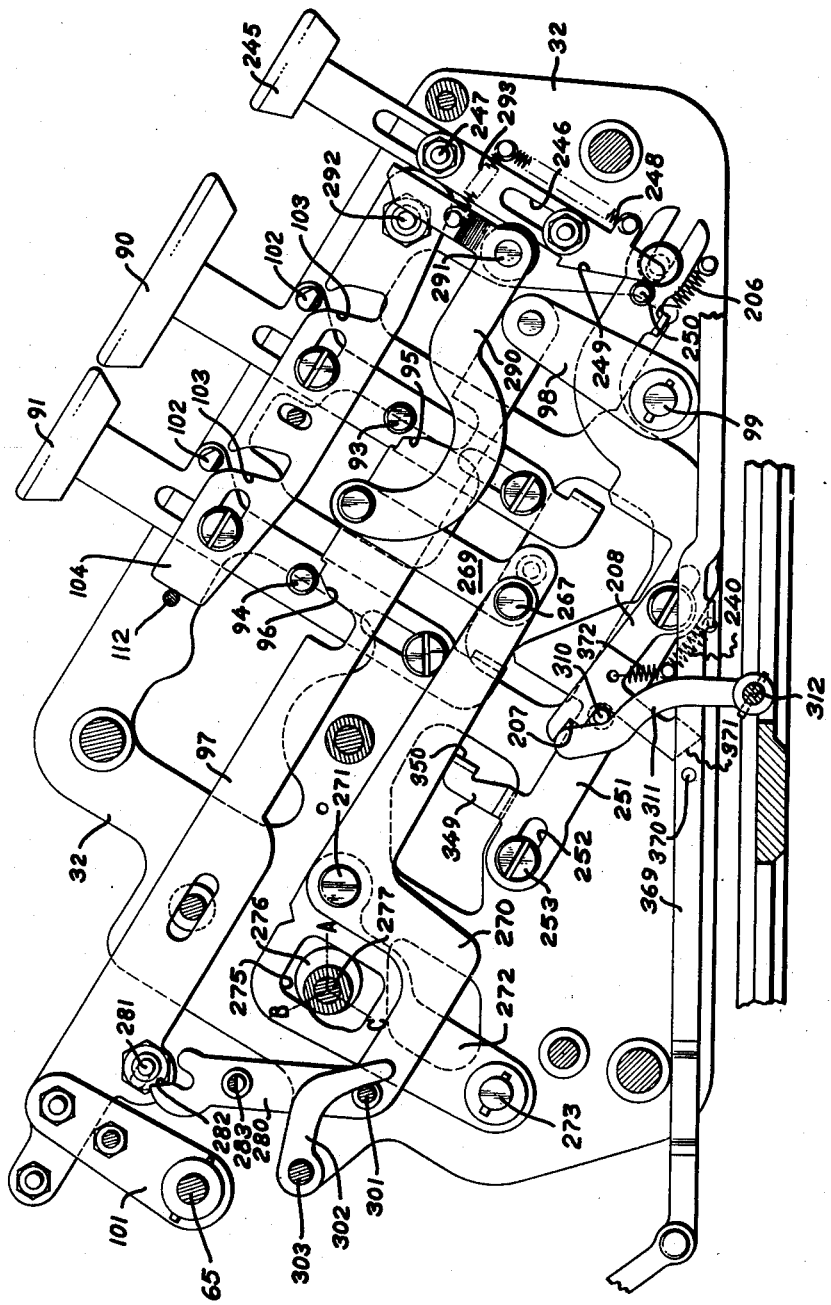

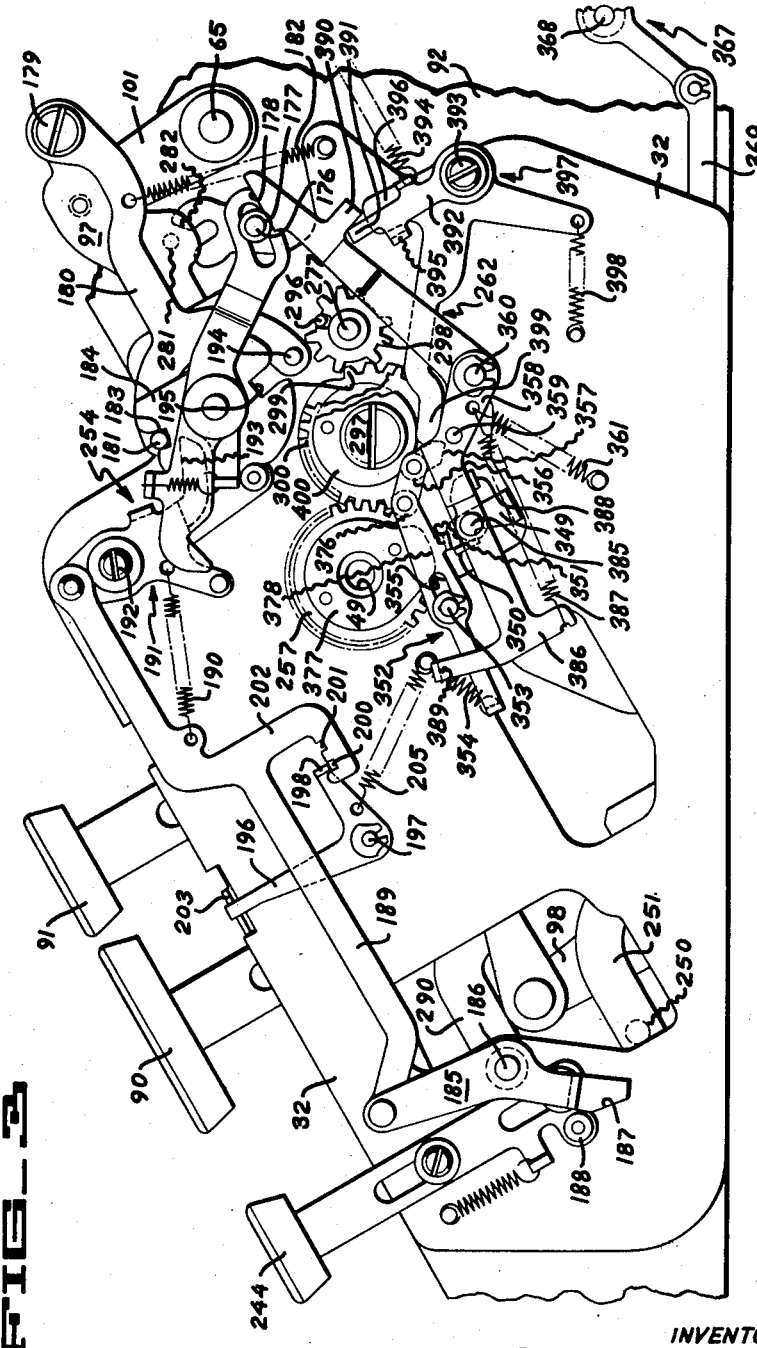

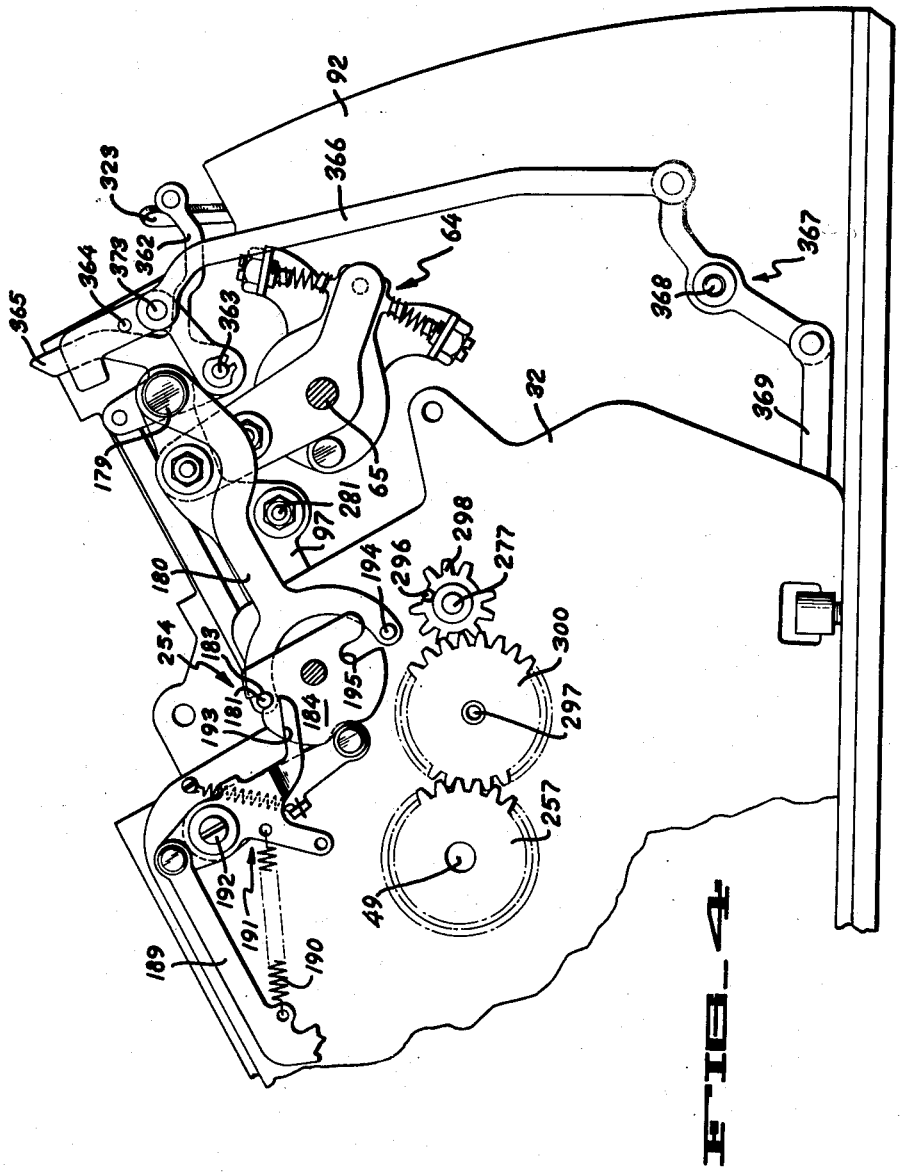

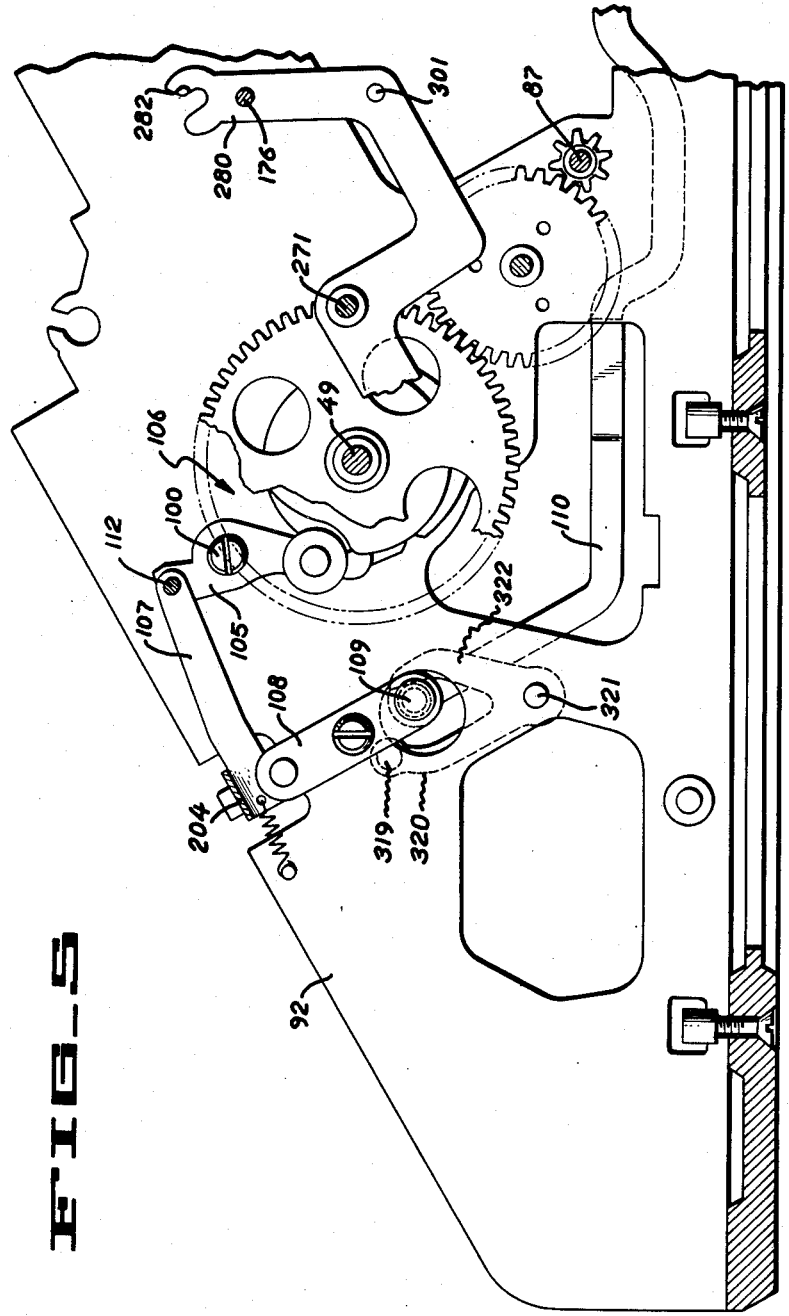

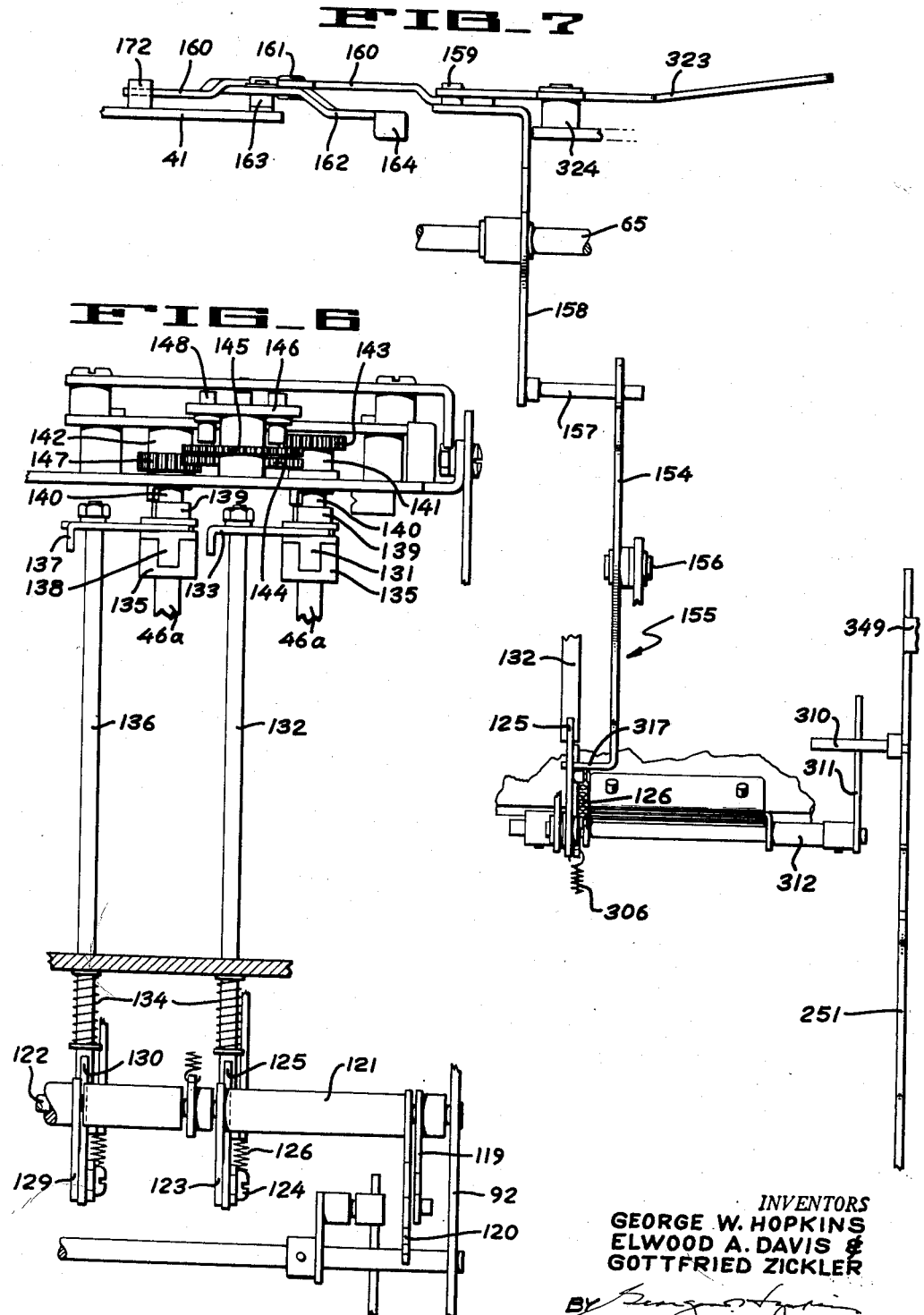

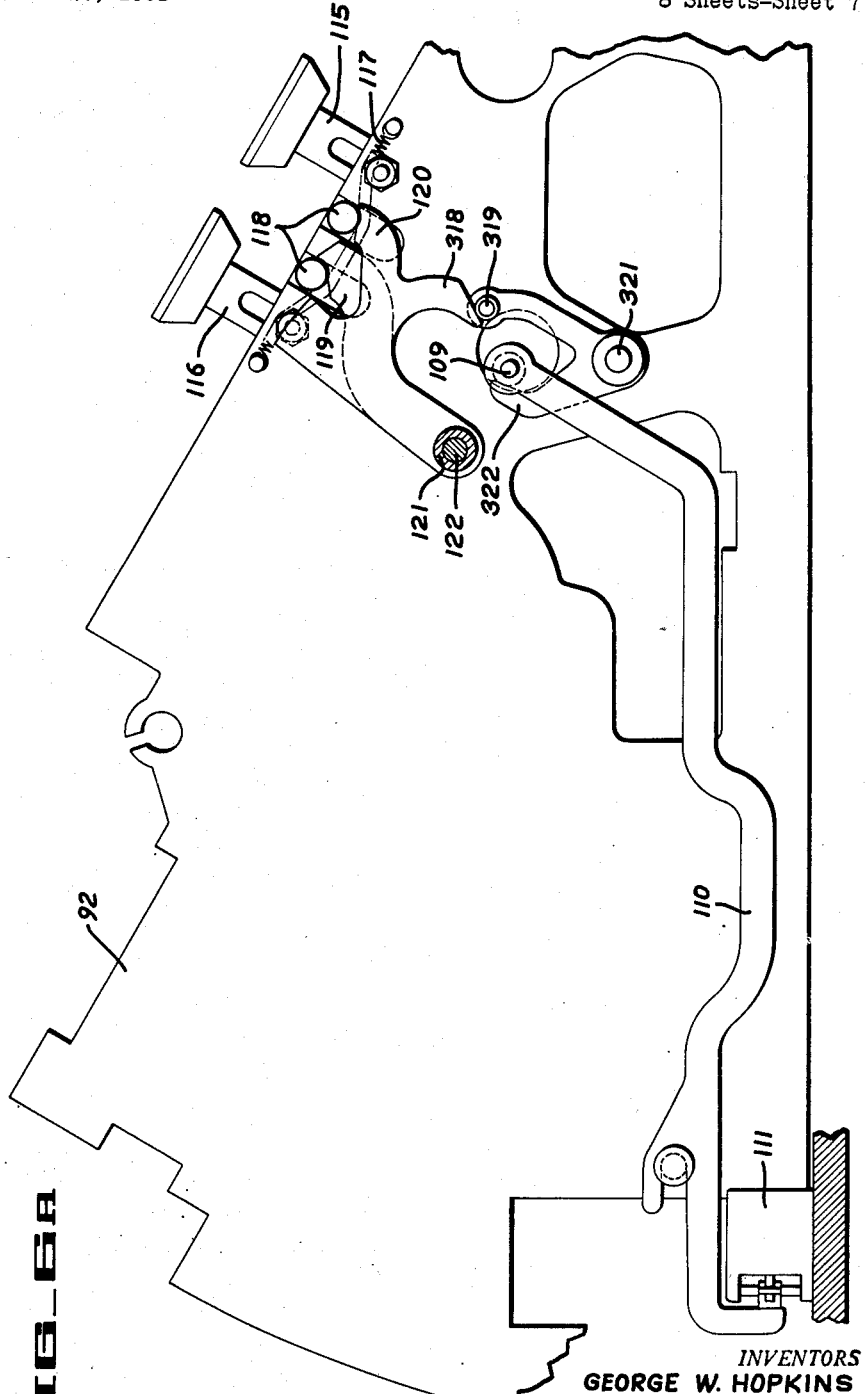

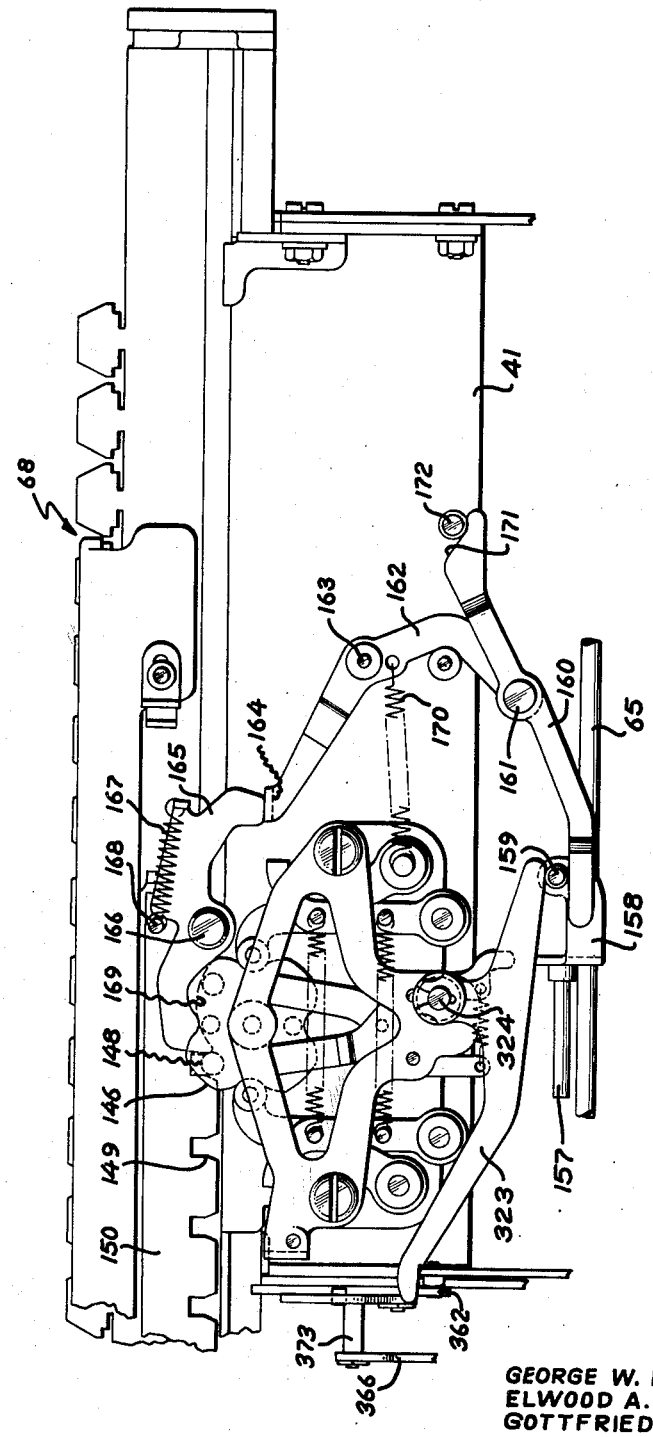

Patented Jan. 19, 1954

2,666,580

UNITED STATES PATENT OFFICE 2,666,580

DIVIDEND-DIVISOR ALIGNING MECHANISM

George W. Hopkins, San Leandro, and Elwood A. Davis and Gottfried Zickler, Castro Valley, Calif., assignors to Friden Calculating Machine Co., Inc., a corporation of California Application January 26, 1951, Serial No. 207,958

8 Claims. (Cl. 235—63)

This invention relates to a division mechanism for calculating machines, and more particularly to an improved means for automatically aligning the dividend and divisor in such a machine as part of an automatic division operation.

In performing division operations on calculating machines of the type having relatively shiftable dividend and divisor receiving devices, it has been necessary in the past for the operator of the machine to enter the dividend and divisor factors into the machine and then to manually control the shift of the factor receiving devices relative to one another until the factors are brought into proper alignment before beginning an automatic division operation. The division mechanism is then set into operation by manipulation of a suitable control key or lever and the machine proceeds to divide the dividend by the divisor in a fully automatic manner without requiring any further attention on the part of the operator. The instant invention deals with an improved means for rendering the operation of such a calculating machine more completely automatic by causing the dividend and divisor to be properly aligned prior to the outset of the division operation proper. In describing the construction and operation of the instant invention, the terms "right shift" and "rightmost or extreme right end position" refer to the carriage shift operation as viewed from the operator's normal position in front of the machine keyboard.

It is an important object of the present invention, therefore, to provide an improved means for first aligning the dividend and divisor factors in a calculating machine by causing the register carriage thereof to be shifted to its rightmost end position before automatically initiating operation of the automatic division mechanism of the machine.

It is another object of the invention to provide an improved means for automatically aligning the dividend and divisor factors in a calculating machine and then dividing the former by the latter in an uninterrupted series of sequential operations by causing the machine to automatically shift the register carriage to its rightmost end position and by delaying operation of the automatic division mechanism thereof until after the right shift operation has been completed.

It is a further object of the invention to provide an improved means of aligning preselected dividend and divisor factors in a calculating machine and then dividing the former by the latter as part of a single continuous operation by automatically engaging and locking the carriage shift mechanism of the machine in its right shift position without initial operation of the automatic division mechanism, and then automatically terminating the right shift operation and concurrently initiating operation of the automatic division mechanism after the shiftable carriage has reached its extreme right end position.

It is also an object of the instant invention to provide improved mechanism for automatically carrying out a division operation by first causing the carriage of a calculating machine to be shifted continuously toward the right, terminating the right carriage shift operation automatically after the carriage has reached its rightmost end position, and then automatically initiating operation of the division mechanism of the machine for causing ordinal shift of the carriage progressively toward the left to first automatically align the division factors and then divide the dividend factor by the divisor factor in an uninterrupted series of sequential operations, and in this respect is an improvement over the copending application of Hopkins and Shackleford, Serial No. 200,656, filed December 15, 1950.

A further object of the present invention is to provide means in a calculating machine having a counter-control mechanism and an automatic shifting means for setting the counter-control mechanism and locking it in such adjusted position throughout the operation of the shifting means.

Further objects are to provide a construction of maximum simplicity, economy, and ease of assembly and disassembly, also such further objects, advantages, and capabilities as will fully appear and as are inherently possessed by the device and the invention described herein.

The invention further resides in the combination, construction, and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof.

Referring to the drawings:

Fig. 1 is a longitudinal sectional elevation showing the right shift control mechanism and basic selecting and actuating mechanisms of the machine.

Fig. 2 is a view showing those parts of the division control mechanism which are mounted on the left-hand side of the control plate.

Fig. 3 is a view of those parts of the division and counter control mechanisms which are mounted on the right-hand side of the control plate.

Fig. 4 is a view similar to Fig. 3 showing a portion of the control means for releasing the automatic division mechanism when the carriage is in its rightmost end position.

Fig. 5 is a right side view of the right side frame showing the mechanism for operating the main cyclic clutch and the motor control switch.

Fig. 6 is a plan view showing the carriage shift control mechanism of the machine.

Fig. 6A is a left side view of the right side frame showing the mechanism operated by the shift control keys.

Fig. 7 is a plan view of the mechanism for releasing the right shift clutch and concurrently initiating operation of the automatic division mechanism after the carriage has reached its rightmost end position.

Fig. 8 is a fragmentary rear view of the machine showing a portion of the control mechanism illustrated in Fig. 7.

The machine to be hereinafter shown and described is basically the same as the calculating machine shown in U. S. Patent No. 2,229,889, issued to Carl M. F. Friden on January 28, 1941, and hence, only so much of the mechanism shown and described in the aforesaid patent will be set forth herein as is necessary in order to provide a complete understanding of the manner in which the present mechanism is related to that shown in the aforementioned patent.

Selecting and actuating mechanisms

Referring now to Fig. 1 of the drawings there is shown a calculating machine provided with a plurality of rows or banks of amount keys 20, each of which is supported for endwise longitudinal movement by a pair of oblong slots 21 adapted to coact with the crossrods 22 which are transversely supported horizontally across the keyboard frame. The keys 20 in each bank are resiliently urged into their raised positions by means of a longitudinally extending coil spring 23 supported by the keyboard frame in such a manner that the spring is threaded over the upper crossrods 22 and under the pins 24 provided on the stems of the keys 20. The lower ends of the key stems carry studs 25 which are adapted to cooperate with inclined cam faces 26 provided on the longitudinally disposed selector bars 27. There are two such bars associated with each bank of keys in the keyboard, and each bar 27 is horizontally supported for endwise reciprocating movement below the keyboard by means of a pair of parallel links 28, the rearward supporting links shown in Fig. 1 being pivotally connected at their upper ends to their selector bars 27 and pivotally supported at their lower ends on a transverse rod 29 supported by an angle bar 30 which extends transversely across the machine.

Each of the selector bars 27 is resiliently urged toward the rear of the machine by a spring 35 tensioned between the lower end of each of the rear supporting links 28 and an angle bar extending between the side frames of the machine. At their rearward ends, the selector bars 27 of each pair are provided with bent over and downwardly depending forked extensions 37 which engage with coacting grooves provided in the hubs of a pair of selector gears 38 which are slidably and nonrotatably mounted on a square shaft 39 which is suitably journalled at its ends in the crossframe members 40, 41, and intermediate its ends is journalled in a bearing provided in an intermediate crossframe 42 extending transversely across the machine.

The selector gears 38 are arranged to cooperate with a drum-type actuator 45 secured to an actuator shaft 46 which is journalled between the crossframe members 40 and 42. The shaft is driven by a bevel gear fixed to its forward end 47, said gear meshing with a bevel gear 48 secured to a unidirectional main drive shaft 49. Also secured to each actuator shaft 46 in a position immediately behind the first drum 45 is a second actuator drum 50 which is adapted to similarly cooperate with a pair of selector gears controlled by an adjacent bank of amount keys 20.

As is more fully shown and described in the aforementioned Patent No. 2,229,889, the drums 45 and 50 are provided with a series of mutilated actuator teeth 52 which serve to rotate the selector gears 38 by differential amounts whenever the latter are slid forwardly on the square shaft 39 and into cooperative driving relationship with the drum teeth 52. As is fully described in the last-mentioned patent, the 1–5 keys 20 control the selector gears associated with the forward end of the actuator drums 45 and 50, while the 6–9 keys control the selector gears associated with the rear end of the actuator drums. When one of the 1–5 keys or one of the 6–9 keys is depressed, its associated selector bar or slide 27 is moved forwardly by a differential amount through the cooperation of the key stem stud 25 with its associated inclined cam face 26, so as to cause the corresponding selector gear 38 to be differentially positioned with respect to its associated actuator drum. The actuator teeth 52 on the drums 45 and 50 will therefore rotate the selector gears 38 and the associated square shaft 39 to an extent depending upon the value of the particular keyboard key 20 which has been depressed.

Slidably and nonrotatably mounted on the rear end of each square shaft 39 is a sleeve 55 to which is secured an add gear 56 and an oppositely disposed subtract gear 57, which gears are arranged to cooperate selectively with a bevel 58 secured to the lower end of a coacting dial shaft 59, the latter being suitably journalled in the frame 60 of the shiftable numeral wheel carriage. Secured to the upper end of each dial shaft 59 is a numeral wheel 61 bearing the numerals from 0–9, which may be viewed through a suitable aperture or window 62 provided in the shiftable carriage housing 63.

The add and subtract gears 56 and 57 are normally maintained in a neutral position and out of engagement with the bevel gears 58 by the action of a conventional spring actuated centralizing mechanism 64 (Fig. 4) which yieldingly tends to maintain a transverse gate control shaft 65 in the neutral position illustrated in Fig. 1. Shaft 65 is suitably journalled in the side frames of the machine and has secured thereto a pair of upwardly extending spaced arms 66 which support, parallel with the axis of shaft 65, a strap or gate 67 lying within the space existing between the add and subtract gears 56 and 57. Whenever gears 56 and 57 are maintained in their neutral position by the action of centralizer 64, as shown in Figs. 1 and 4, the numeral wheel carriage 68 may be shifted laterally across the machine without interference from add gear 56 or subtract gear 57. However, by means of mechanism to be hereinafter more fully described, the gate 67 may be moved rearwardly so as to engage add gear 56 with bevel gear 58 so that upon rotation of the actuator shafts 46 the accumulator wheels 61 will be rotated in a forward or positive direction. Similarly, in subtract operations, the gate 67 is moved forwardly so as to cause the subtract gear 57 to mesh with gear 58 and thereby cause the dial shafts 59 to be rotated in a reverse or negative direction upon unidirectional rotation of the actuator shafts 46.

Tens transfer mechanism

Secured to the lower end of each dial shaft 59 just above the gear 58 is a transfer cam 70 which is adapted to cooperate with with a transfer lever 71, bearing a stud 72, which is journalled in the carriage frame bar 60. Mounted on the outer end of the transfer lever 71 is a downwardly depending pin 73 which lies between a pair of flanges provided on the hub 74 of a tens-transfer gear 75 located in the next higher order of the machine. The hub 74 and the gear 75 are slidably and nonrotatably mounted on the square shaft 39 in such a manner that rotation of the gear 75 will be transmitted through the add-subtract gears 56, 57 to the coacting dial shaft 59. When the accumulator numeral wheel 61 passes from 0-9 or from 9-0, a single tooth or nose on the transfer cam 70 is operative to rock the transfer lever 71 and move the pin 73 forwardly so as to move the transfer gear 75 longitudinally into the path of a single transfer tooth provided on a tens-transfer actuator 76 secured to the actuator shaft 46. Since pin 73 is operative to control the transfer gear 75 in the next higher order of the machine, the accumulator wheel 61 in the next higher order will be advanced one step by the tens-transfer actuator 76 in such a manner as to effect the tens-carry from one order to the next higher order as required. This mechanism is also fully described in Patent No. 2,229,889, above mentioned.

Revolutions counter

Also provided in the numeral wheel carriage 68 is a series of revolutions counter wheels 80, each of which is secured to a longitudinally extending shaft 81 having its opposing ends suitably journalled in the carriage. Each of the wheels 80 is provided with a series of numerals from 0-9 which may be viewed through a window 83 provided in the carriage cover or housing 63. Secured to each of the shafts 81 in a position adjacent to the wheels 80 is an actuator gear 84 which is arranged to cooperate with a revolutions counter actuator mechanism 85 mounted on a shaft 82. The actuator mechanism is adapted to be rocked into operative engagement with the aligned actuator gear 84, after which shaft 82 is translated axially to effect entry of the digit. Whenever the numeral wheel carriage 68 is in its extreme left-hand position, the rightmost revolutions counter wheel 80 will be thus advanced one step for each cycle of the machine. This mechanism is fully shown and described in the above-mentioned Patent No. 2,229,889 to which reference may be had for a full and complete disclosure of the revolutions counter mechanism.

Plus and minus keys

A plus key 90 and a minus key 91 (Fig. 2), slidably mounted on control plate 32, selectively determine positive or negative registration on the carriage numeral wheels 61, and a depression of either of the keys 90, 91 serves to engage the clutch, close the motor circuit and select the sign character of the registration in the accumulator dials. The plus and minus keys 90, 91 are provided with the respective roller studs 93 and 94 (Fig. 2) which cooperate with inclined cam faces 95 and 96, respectively, formed on a gate setting slide 97. Slide 97 is pivotally connected to the upper ends of arms 98 and 101 (Fig. 2), the arm 98 being pivoted at 99 on the control plate 32, while the arm 101 is secured to and rocks the gate shaft 65. Thus, depression of plus key 90 moves the gate setting slide 97 rearwardly in such a manner as to rotate shaft 65 clockwise (Fig. 1), thereby moving gate 67 toward the rear of the machine so as to cause the add gears 56 to engage with the dial shaft gears 58. Similarly, depression of the minus key 91 brings stud 94 into engagement with the inclined surface 96, thereby causing slide 97 to move forwardly and rotate gate shaft 65 counter-clockwise (Fig. 1) so as to bring the subtract gears 57 into engagement with the dial shaft gears 58.

In order to initiate operation of the drive mechanism of the machine when either of the control keys 90 or 91 is depressed, each of these keys is provided with a half-round stud 102 which is adapted to cooperate with a cam face 103 provided on the cycle initiating slide 104, (Fig. 2). As is fully shown and described in the afore-mentioned Friden Patent No. 2,229,889, this slide 104 coacts with a pin 112 carried by a clutch control lever 105 (Fig. 5) in such a manner that whenever either of the control keys 90 or 91 is depressed the slide 104 will be moved rearwardly so as to rock the clutch control lever 105 clockwise (Fig. 5) to cause engagement of the main cyclic clutch 106. Clutch control lever 105 is pivoted at 100 on side frame 92 and is also connected by a link 107 with a pivoted lever 108. The lever 108 is pivotally connected, by a pin 109 extending through a suitable opening in frame 92, to a long link 110 adapted to close the normally open contacts of a microswitch 111 (see also Fig. 6A). The switch controls current supplied to the electric motor 86 (Fig. 1) that drives the machine.

Carriage shift mechanism

Means are provided for shifting the carriage 68 selectively in either direction for one or more ordinal steps of movement. The shifting means is preferably operated from the extended actuating shafts 46a (Fig. 6) under the control of a pair of manually depressible shift keys which control shifting of the carriage for one or more steps of movement in accordance with the length of time during which such keys are maintained depressed.

Referring now to Fig. 6A, the respective right and left shift control keys 115, 116 are suitably mounted for vertical sliding movement on the side frame 92 by suitable pin and slot connections and are resiliently urged upwardly to their inactive or raised positions by a suitable spring 117. Each shift key 115, 116 is provided with a pin 118 which projects on either side of the associated key, the outer end of each pin 118 being adapted to cooperate with a suitable cam surface on a claw arm, not shown, which is operatively connected to clutch control lever 105 (Fig. 5). Hence, upon depression of either shift key 115, 116 the levers 107 and 108 are rocked in the manner previously described to engage the main cyclic clutch 106 (Fig. 5) and close the normally open micro-switch 111 (Fig. 6A) for operating the driving mechanism of the machine.

Prior to engagement of clutch 106 and closure of micro-switch 111, each of the shift keys 115, 116 is operative to engage corresponding shift drive connections so that selective shifting of the carriage 68 in either direction for one or more ordinal positions is determined by depression and release of the respective shift keys. As shown in Fig. 6A, the inner ends of the pins 118 carried by the shift keys 115, 116 are operatively related to the rocker arms 120, 119 which are carried respectively by the sleeve 121 and shaft 122 on which sleeve 121 is pivotally mounted. As shown in Figs. 1 and 6, sleeve 121 also carries a depending arm 123 having a pin 124 thereon on which a pusher link 125 is pivotally mounted. Spring 126 urges pusher link 125 in a clockwise direction (Fig. 1) to maintain its notched end 127 in operative engagement with the forward end of a push rod 132 which is slidably mounted for endwise movement in the crossframe members 40 and 42. Thus, depression of the right shift key 115 acts through arm 120, sleeve 121, and arm 123 for causing pusher link 125 to move the push rod 132 rearwardly. Depression of the left shift key 116 acts through arm 119 to rock shaft 122 which carries a depending arm 129 similar to arm 123 on which a spring-urged pusher link 130, similar to pusher link 125, is pivoted for engagement with a left shift control rod 136 (Fig. 6).

The respective push rods 132 and 136 upon depression of the respective shift keys 115, 116 serve to enable respective drive connections from one of the extended actuating shafts 46a to a shift drive plate 146 in a manner now to be described. As seen in Fig. 6, each of the push rods 132 and 136 has secured to the rear end thereof the respective forked arms 133 and 137. Suitable compression springs 134 on the respective rods 132 and 136 tend to maintain each such push rod connection forwardly in clutch-disengaging position. Forked arms 133 and 137 engage respective annular grooves in shiftable drive establishing collars 131 and 138, which have endwise slidable driving engagement with coacting collars 135 (Fig. 6) secured on rearward ends of the adjacent extended actuating shafts 46a. The shiftable collars 131 and 138 are provided with suitable driving teeth 139 adapted for clutching engagement with the opposed driving notches 140 on the respective gear sleeves 141 and 142.

As shown in Fig. 6, gear sleeve 141 carries a gear 143 which meshes with a wide idler gear, not shown, which drives a large gear 144 on a compound gear assembly including a smaller gear meshing with a gear 145 on a shift drive assembly which includes the shift drive plate 146. Gear sleeve 142 carries a gear 147 which meshes directly with gear 144 on the drive gear assembly. Hence, whenever the gear sleeves 141 and 142 are driven, they serve to drive the gear train which includes the large gear 144 and shift drive plate 146 in opposite directions. Preferably this gearing provides a drive ratio of 4 to 1, so that each rotation of the gear sleeves 141 or 142 will provide a one-quarter rotation of shift drive plate 146. As is best shown in Fig. 8, plate 146 carries four equidistantly spaced shift drive pins 148 adapted for engagement with coacting notches 149 provided in a shift rack 150 secured to the back of the shiftable carriage 68. Hence, for each ninety degrees of rotation of shift drive plate 146 the carriage 68 will be shifted through a distance equal to the spacing between the notches 149, which is equal to the distance between the numeral wheel shafts 59 of the machine. In other words, the carriage will be shifted one ordinal space for each cycle of operation of the main drive shaft 49.

The shift control arrangement is such that depression of right shift key 115 operates through its associated linkage for engaging drive tooth 139 with its corresponding notch 140 on gear sleeve 141 (Fig. 6), thus causing rotation of shift drive plate 146 in one direction to effect right-hand shifting of carriage 68. Correspondingly, depression of the left shift key 116 causes shifting of the carriage to the left by engaging tooth 139 with its corresponding notch 140 on gear sleeve 142 to rotate shift drive plate 146 in the opposite direction.

Means is provided for automatically disabling the right carriage shift operation whenever the shiftable carriage 68 reaches its extreme right end position. For this purpose mechanism is provided for automatically lifting the pusher link 125 and moving the same out of the range of push rod 132 (Fig. 1) whenever the carriage reaches its rightmost end position. The lifting of pusher link 125 against the urgency of spring 126 is accomplished by means of an arm 155 (Fig. 1) rotatably mounted on transverse shift 156 journalled at either end in suitable brackets secured to the frame of the machine. As shown in Fig. 1, the lifter arm 155 has integrally formed therewith a rearwardly extending arm 154 which is provided with an oblong slot that embraces a pin 157 mounted on the forwardly extending arm of a lever 158 loosely journalled on gate shaft 65. Lever 158 has a rearwardly extending arm which carries a roller 159 which lies above one end of a lever 160 (see also Fig. 8) which is pivoted at 161 on a lower end of a lever 162 pivoted at 163 on the crossframe member or rear bearing plate 41. Lever 162 has an upwardly extending arm which is provided with a formed-over ear 164 lying beneath an override pawl 165 (Fig. 8) which is pivotally mounted at 166 on the carriage shift rack 150. This pawl 165 is normally maintained in the position shown in Fig. 8 by means of a spring 167 which urges a shoulder formed on the pawl against a stud 168 on shift rack 150. When the shiftable carriage 68 reaches the end position shown in Fig. 8, the shift pins 148 engage with a cam surface 169 formed on pawl 165 and cause the pawl to be rocked clockwise against the urgency of spring 167. The lever 162 will thereby be rocked counterclockwise against the tension of spring 170, thereby causing lever 160 to be moved toward the right as viewed in Fig. 8. Lever 160 is provided with a cam face 171 which lies beneath a roller 172 mounted on the rear bearing plate 41. Hence, when the lever 160 is moved toward the right as viewed in Fig. 8, it will be rocked clockwise thereby elevating the rear end of lever 158 so as to cause the lifter arm 155 (Fig. 1) to be raised and cause the pusher link 125 to be disengaged from the push rod 132. This will effectively disable the right shift mechanism and permit the compression spring 134 mounted on the forward end of push rod 132 to disengage the previously engaged right shift clutch and thereby terminate the right shift operation.

The foregoing description of the carriage shift mechanism is believed sufficient for a clear understanding of the instant invention, and reference is hereby made to Patent No. 2,380,642 issued to Carl M. Friden et al. on July 31, 1945, for a more detailed disclosure of this part of the machine.

Automatic division mechanism

The machine shown in the accompanying drawings is provided with a mechanism for enabling a dividend set up on the accumulator numeral wheels 61 to be automatically divided by the method of successive subtraction by a divisor set up on the amount keys 20. As was mentioned earlier herein, the mechanism provided in the present machine for accomplishing this purpose is similar to that shown in U. S. Patent No. 2,229,889, and, therefore, only those parts of the automatic division mechanism which are directly concerned with the present invention will be described herein.

The automatic division mechanism operates to control the functioning of the machine so as to cause the divisor to be repeatedly subtracted from the dividend until an overdraft occurs in the accumulator, whereupon the overdraft is corrected and the carriage is then automatically shifted one ordinal space to the left. This sequence is continually repeated during the division operation and the number of subtraction cycles effected in each order is registered in the revolutions counter as the quotient. This division operation is controlled by the program control mechanism, which becomes effective each time an overdraft occurs in the accumulator and functions to program the operation of the add-subtract mechanism and the carriage shift mechanism in such a manner as to cause a predetermined sequence of operations during uninterrupted cyclic operation of the division mechanism. The division operation is initiated by rocking the division control lever 262 (Fig. 3), in a manner to be later described, which operation causes the program control mechanism to be operatively connected with the add-subtract gate and the carriage shift mechanism by engagement of the cam face 282 with the pin 281 (Fig. 2). It also renders the overdraft control mechanism effective to control the operation of the program control mechanism. All such operations are shown and described in Patent No. 2,327,981, issued to Carl M. Friden on August 31, 1943.

The division mechanism of the machine includes a link 269 which is pivotally connected as at 267 to the forward end of a connecting lever 270 (Fig. 2), which lever is pivoted as at 271 to a follower arm 272 pivoted as at 273 on control plate 32. This arm 272 is spring-urged in a clockwise direction (spring not shown), as viewed in Fig. 2, and is provided with a square aperture 275 within which is located an eccentric cam 276 secured to a program controlling shaft 277, corresponding to shaft 222 in the above-mentioned Patent No. 2,327,981. As is more fully described in the patent, shaft 277 forms a part of the program control mechanism and is rotated intermittently during division operations in such a manner as to control the setting of the add-subtract gate 67 and the operation of the left shift clutch, which operations are performed in a predetermined sequence so as to cause the machine to carry out a division operation in a fully automatic manner.

Lever 270 is provided at its rearward end with an upwardly directed arm 280 (Fig. 2) which is bifurcated at its upper extremity for the purpose of engaging with a stud 281 carried by the gate setting slide 97. A pin 176 extending laterally outwardly from arm 280 carries a roller 177 (Fig. 3) which engages with a cam face 178 on the division control lever 262 so that as lever 262 is rocked, in a manner to be hereinafter described, it causes lever 270 to be rocked clockwise (Fig. 2). When the control shaft 277 is in the normal or home position illustrated in Fig. 2, cam 276 thereon causes arm 272 to be maintained in its most forward position. Thus, when lever 270 is rocked clockwise an inclined cam face 282 provided on the rear lip of the bifurcation engages with stud 281 and forces gate setting slide 97 into its forward position so as to engage the subtract gears 57 with the dial shaft gears 58. Mounted on the arm 280 and extending inwardly therefrom is a half-round stud 283 (Fig. 2) which is adapted to be engaged by a spring-pressed latch, not shown, so as to retain lever 270 in its operative position throughout the division operation.

Pivotally connected to the upper end of link 269 is the rearwardly extending arm of a bell-crank lever 290 (Fig. 2) which is pivotally supported at its forward end by a screw 291 secured to control plate 32. This lever 290 has an upwardly extending right angle extension which lies immediately in front of a pin 292 carried by the cycle initiating slide 104. Lever 290 is urged clockwise (Fig. 2) by a spring 293 which also urges link 269 upwardly, and thus tends to maintain lever 270 in the normally inactive position shown in Fig. 2. Rocking of lever 290 against the tension of spring 293 causes the upper arm of the lever to push against pin 292 and move slide 104 rearwardly. This movement of slide 104, operating through pin 112 (Figs. 2 and 5) rocks clutch pawl 105 to engage the main drive clutch, and acts through link 107, arm 108, and link 110 (Fig. 6A) to close the motor switch 111 in the manner previously described.

Referring now to Figs. 3 and 4, it will be noted that program control shaft 277 extends through control plate 32 and has secured to its right-hand end a small mutilated gear 298. This gear is positionable in driven relationship with a larger segmental gear 299 (Fig. 3) secured to a conventional gear 300, the latter being rotatably journalled on a screw 297 mounted on the control plate 32. Gear 300 meshes with gear 257 carried by main drive shaft 49, with the result that gear 257 drives gear 300 and the large segmental gear 299 associated therewith whenever the main clutch 106 is engaged. The small mutilated gear 298 is normally located in an inoperative position wherein it lies out of the plane of the larger segmental gear 299, which position is determined by a notch provided in gear 298 engaging over a pin 296 projecting outwardly from the control plate 32. As viewed from the front of the machine, shaft 277 and the small mutilated gear 298 carried thereby are normally urged to the left by a suitable compression spring, not shown, mounted on the left-hand end of the shaft 277. With the shaft 277 in its leftward position, the notch in gear 298 engages pin 296 and permits the small mutilated gear 298 to lie to the left of the large segmental gear 299. As shown in Fig. 3, gear 298 has three sets of three teeth, each set being adapted for cooperation with a single set of two teeth provided on the large mutilated gear 299. Gear 299 rotates counter-clockwise during cycling of the machine but normally does not drive mutilated gear 298 as the latter is displaced to the left thereof.

However, when shaft 277 is forced to the right, the pin 296 holds gear 298 in the plane of segmental gear 299, so that the two teeth of segmental gear 299 are positioned to successively engage each of the sets of three teeth on gear 298, before the mutilated gear returns to its normal plane. Thus, when gear 298 is projected into the path of gear 299 during a division operating cycle, gear 298 will be rotated clockwise through one-third of a revolution at the end of the first complete revolution of gear 300, and also through one-third of a revolution at the end of each of the two next succeeding complete revolutions of gear 300.

A stud 301 mounted below stud 283 on lever 270 (Fig. 2) lies beneath the forward end of an arm 302 secured to a laterally extending shaft 303, which corresponds with shaft 228 in Patent No. 2,327,981, supra. It will thus be seen that as connecting lever 270 is rocked clockwise (Fig. 2), pin 301 acts through arm 302 to impart a corresponding counter-clockwise rocking movement to shaft 303, as described in Patent No. 2,327,981, supra, thereby determining operation of the overdraft responsive device associated with the automatic division mechanism of the machine. As soon thereafter as an overdraft occurs in a preselected higher order such as the twelfth order of the machine, the shaft 277 will be displaced axially so as to move the small mutilated gear 298 into the plane of the associated driving gear 299. In this manner, shaft 277 will be given one cycle of movement during the next three machine cycles, after which gear 298 will drop back over the pin 296 and be returned to its inactive position.

Whenever cam 276 occupies the position marked A in Fig. 2, which is the position of the cam when the notch in the small mutilated gear 298 engages with pin 296, clockwise movement of lever 270 (Fig. 2) causes gate setting slide 97 to be moved forwardly in such a manner as to engage the subtract gears 57 with the dial shaft gears 58. At the end of the subtract cycle in which an overdraft occurs, however, shaft 277 will be rotated counter-clockwise (Fig. 2) through 120° to the position marked B, with the result that arm 272 will be rocked counter-clockwise and move lever 270 toward the rear of the machine, thereby causing the add-subtract gate 67 to be moved to its add position. As is fully shown and described in the afore-mentioned Patent No. 2,327,981, during the next machine cycle the divisor set up on the amount keys 20 will be added back into the accumulator dials, thus correcting the overdraft, and at the end of this correction cycle shaft 277 will be rotated through another 120° to the position marked C, in which latter position cam 276 moves arm 272 to an intermediate position for determining a single order left-shift operation wherein the add-subtract gears 56 and 57 are held out of engagement with the coacting dial shafts 58 during shifting movement of the carriage.

The above-described mechanism is substantially the same as that described in Friden Patents Nos. 2,229,889 and 2,327,981, supra, to which patents reference may be had for a more complete description thereof.

There is also provided mechanism effective during operation of the machine for locking the revolutions counter mechanism in such a position as to selectively determine either like or unlike registration in the accumulator and revolutions counter. For this purpose, there is indicated generally at 254 (Figs. 3 and 4) a counter-control mechanism of the type shown and described in Patent No. 2,294,111, granted to Carl M. F. Friden on August 25, 1942, wherein a pivoted control arm 180 operatively connected with the slide 97 and the gate control shaft 65 is provided with a forked forward end carrying a pin 181 which is normally urged by a spring 182 into engagement with a coacting slot 183 on a counter setting member 184, thus normally determining like registration in the accumulator dials 61 and revolutions counter dials 80 as described in the patent.

Although the counter-control setting illustrated in Figs. 3 and 4 is sometimes used in performing division operations wherein complementary quotient figures are desired, the operation of the counter-control mechanism normally must be reversed to determine unlike registration in the accumulator and revolutions counter while performing most division operations in order that true figure quotients will be obtained. For this purpose there is provided a counter-reversing key 244 (Fig. 3) which when depressed rocks bellcrank 185 counter-clockwise about its pivot 186 by engagement of the cam face 187 with a stud 188 on the key stem, thus moving the control link 189 forwardly against the tension of return spring 190. The rear end of the link 189 is pivotally connected to a bellcrank indicated generally at 191 by any suitable means, such as the pin shown. As bellcrank 191 is rocked counter-clockwise about its pivot 192 by the control link 189, a rearwardly extending finger 193 on the bellcrank engages with and lifts pin 181 out of the coacting notch 183, against the tension of spring 182 and rocking the control arm 180 clockwise about its pivot 179 (Fig. 3) until the pin 194 on the lower fork of arm 180 engages the coacting slot 195 on the member 184, thus conditioning the counter-control mechanism for unlike registration in the revolutions counter with respect to the accumulator as described in the above-mentioned Patent No. 2,294,111.

For locking the counter-control mechanism in one of its two adjusted positions during operation of the calculating machine, there is provided a bellcrank 196 (Fig. 3) which is urged by a spring 205 in a clockwise direction about its pivot 197 so that an ear 198 on the bellcrank engages with one of the notches 200, 201 on a downwardly and forwardly extending right angle extension 202 provided on the counter-control link 189. Whenever the machine is in its full-cycle position, an ear 203 on a flange 204 (Figs. 3 and 5) which extends laterally outwardly from link 107 rocks bellcrank 196 counter-clockwise (Fig. 3) against the tension of its spring 205 to release ear 198 from locking engagement with the notches 200, 201 so that the setting of the counter-control mechanism 254 can then be easily changed by suitable control means, as by depressing the counter-reversing key 244. This key preferably is located on the machine in close proximity to a division control key 245 (Fig. 2) so that both keys can be conveniently depressed together in order to initiate a normal division operation. However, possible misoperation of the machine which might be caused by any attempted change in the previous setting of the counter-control mechanism is prevented by positive engagement of ear 198 (Fig. 3) with one of the notches 200, 201 on the counter-control link 189 as long as the machine is operating or is out of its full-cycle position.

Means for initiating operation of the automatic division mechanism

Means is provided for locking the carriage right shift clutch in its engaged position and enabling operation of the carriage shift drive, while at the same time delaying operation of the automatic division mechanism of the machine until the right shift operation is automatically terminated after the carriage reaches its extreme right end position. For this purpose there is provided a division control key 245 (Fig. 2) supported by a longitudinally disposed pair of elongated slots 246 for endwise sliding movement on the coacting guide studs 247 carried by control plate 32. Key 245 is normally urged to its raised position by means of a suitable return spring 248 and the key is also provided with an inclined cam face 249 which bears against a roller 250 mounted on a division control slide 251. This slide is supported for endwise sliding movement on control plate 32 by a plurality of elongated slots 252 which cooperate with studs 253 mounted on the control plate. Whenever key 245 is depressed against the tension of spring 206 to move slide 251 rearwardly from its first adjusted position to its second adjusted position by engagement of roller 250 with the cam face 249, a pin 310 on slide 251 moves into engagement with a notch 207 on a spring-urged latch 208 (Fig. 2) so as to retain the control slide 251 in its rearward or second adjusted position after key 245 is returned to its initial position, and slide 251 remains latched back in its rearward position until the latch 208 is released from holding engagement with pin 310 by mechanism to be later described. As slide 251 is thus latched back in its rearward position, the pin 310 thereon also rocks a transverse shaft 312 counter-clockwise (Fig. 2) by camming engagement with an arm 311 affixed thereto. Shaft 312 also carries an arm 313 (Fig. 1) which engages the pin 320 (Fig. 1) so as to rock arm 123 and the yieldable pusher link 125 counter-clockwise about the axis of shaft 122, thus causing the control rod 132 to be moved rearwardly to its right shift engaging position. Hence, the right shift clutch mechanism is latched in its engaged position until the right carriage shift operation is automatically terminated after the carriage 68 reaches its extreme right end position, and the overtravel responsive mechanism thereafter rocks arm 155 against the tension of spring 126 to lift the notched end 127 of pusher link 125 out of engagement with the forward end of the right shift clutch control rod 132 in the manner previously described. During the time the right shift control rod 132 is moved rearwardly and held in its clutch-engaging position by engagement of the latch 208 with the pin 310 (Fig. 2), a corresponding rocking movement is imparted through arm 123 to sleeve 121, thereby rocking arm 120 clockwise (Fig. 6A) so that a downward projecting extension 318 thereon forms a camming engagement with a pin 319 on one arm of a bellcrank pivoted as at 321 on the side frame 92. The other arm 322 of the bellcrank bears against the pin 109 so that clockwise movement of the bellcrank moves the pin forwardly to rock lever 105 (Fig. 5), thus concurrently closing the main cyclic clutch 106 and the normally open contacts of micro-switch 111 (Fig. 6A) to enable the carriage shift drive in the manner previously described.

In order to control the means for initiating operation of the automatic division mechanism, there is provided on the division control slide 251 an upwardly projecting right angle extension 349 provided with a lug 350 (Figs. 2 and 3), the upper edge of which upon rearward movement of slide 251 forms a camming engagement with a coacting ear 351 on a division initiating pawl 352 (Fig. 3) so as to slightly tilt or rock the pawl 352 counter-clockwise about its pivot 353, and as lug 350 moves rearwardly past the ear 351 spring 354 causes the latter to drop down behind the lug to condition active engagement therewith. Pawl 352 has an oblong slot 355 therein which forms a sliding pivot connection with the fixed pivot pin 353, the pin being normally held in engagement with the forward end of slot 355 (as shown in Fig. 3) by the resilient action of spring 354. Pawl 352 is also provided with a roller 356, and has a downwardly extending rearward tip 357 which is freely slidable within a longitudinal groove bounded on one side by the forward end of division initiating lever 262 and on the other side by a plate 358 having the same general configuration as the forward end of lever 262, which plate is secured to the lever 262 by a suitable spacer rivet 359. Thus, plate 358 and lever 262 form a unitary structure which is free to pivot about the pin 360 and is urged counter-clockwise by a spring 361 tending to hold the cam face 178 on lever 262 in resilient contact with the roller 177 carried by the connecting lever 270. Spring 354 also tends to rock pawl 352 clockwise about its pivot 353 so as to resiliently hold the roller 356 on pawl 352 in freely slidably cam-acting engagement with the coacting upper surface of the division initiating lever 262.

It will be recalled that pawl 165 (Fig. 8) imparts a rocking movement to lever 160 during the attempted overstroke of the carriage shift mechanism which occurs after the carriage reaches its extreme right-hand position. Such rocking of lever 160 causes the inner end thereof to elevate the roller 159 and rock the lever 158 to rock the lifter arm 155 clockwise (Fig. 1). Such operation moves the notched end 127 of pusher link 125 out of holding engagement with the shift control rod 132, whereupon rod 132 is moved forwardly by the return spring 134 (Fig. 6) so as to disengage the right shift clutch. For automatically initiating operation of the automatic division mechanism of the machine at substantially the same time as the right shift clutch is disengaged, there is pivotally mounted as at 324 on the rear bearing plate 41 a lever 323 which is adapted to be rocked counter-clockwise (Fig. 8) by the upward movement imparted to roller 159 by the well-known overtravel responsive mechanism previously described. Rocking of lever 323 in a counter-clockwise direction (Fig. 8) depresses one arm 362 of a bellcrank 365 pivoted at 363. An upwardly extending arm of bellcrank 365 engages a pin 364 (Fig. 4) on the upwardly extending arm of a second bellcrank also pivoted on the pin 363 to depress the link 366 which is pivotally mounted thereon at 373. As link 366 is thus depressed, it rocks lever 367 clockwise about its pivot 368 (Fig. 4) and moves control link 369 forwardly against the tension of spring 240 to cause a pin 370 on link 369 (Fig. 2) to engage a coacting cam face 371 on latch 208 and rock the latter clockwise in opposition to the action of spring 372, thus releasing the notch 207 on latch 208 from holding engagement with the pin 310 on the division control slide 251.

Upon the release of latch 208 from engagement with pin 310, slide 251 is moved from its rearward position to the forward position shown in Fig. 2 by the resilient action of the relatively strong spring 206. During this release operation, arm 313 is restored by spring 306 to the position shown in Fig. 1, thus enabling the spring 126 to restore the notch 127 on pusher link 125 to its full cycle position as shown. Spring 306 also rocks shaft 312 and causes arm 311 to be held in resilient engagement with pin 310 during return movement of slide 251 to the position illustrated in Fig. 2. As slide 251 is thus moved by spring 206 from its rearward to its forward position, the forward edge of lug 350 thereon engages with the rear edge of ear 351 so as to move pawl 352 forwardly along with slide 251, thus tensioning spring 354 and moving the rear portion of oblong slot 355 (Fig. 3) into engagement with the fixed pivot pin 353 while the roller 356 on the pawl 352 moves along the coacting upper planar surface on lever 262. This forward movement which is thus imparted to pawl 352 by engagement of ear 351 with the lug 350 brings a cam follower 376 on pawl 352 into the operative range of a plate cam 377 which rotates with the main drive shaft 49 of the machine. After pawl 352 is thus moved forwardly to its active position, the high point 378 of cam 377 engages the follower 376 and rocks pawl 352 clockwise about its pivot 353, causing the pawl roller 356 to rock lever 262 counterclockwise about its pivot 360 (Fig. 3) so that the camming surface 178 on arm 262 cooperates with roller 177 to rock the cam face 282 on the connecting lever 270 into operative engagement with the pin 281 on the gate setting slide 97, thus initiating an automatic division operation in the manner previously described.

For enabling the pawl 352 to be restored to its normally ineffective position after initiation of the automatic division operation, there is pivotally mounted at 385 on the forward end of lever 262 a yieldable holding arm 386 urged by a relatively strong spring 387 to the position shown in Fig. 3 wherein an ear 388 on the arm normally forms a limiting engagement with the lower forward edge of lever 262. An extension on arm 386 is also provided with an ear 389 which overlies the forward end of pawl 352. Hence, when arm 262 is rocked counterclockwise to its division initiating position by the power-operated cam-acting pawl 352, the ear 389 holds pawl 352 in such a position that the ear 351 thereon is free to be urged rearwardly past the connecting lug 350 on slide 251 by the resilient action of spring 354. While pawl 352 is thus being restored by spring 354 to the initial position shown in Fig. 3, lever 262 is positively held in its division-initiating position by latching engagement of a downwardly extending dog 390 on lever 262 with an upwardly extending tip 391 on a latching arm 392 which is urged in a clockwise direction about its pivot 393 by a spring 394. Rocking of arm 392 in a clockwise direction (Fig. 3) is limited by engagement of an ear 395 on arm 392 with the upwardly extending arm 396 of a bellcrank 397. This bellcrank is urged in a clockwise direction about its pivot 393 by a spring 398 which tends to hold a forwardly extending arm 399 on bellcrank 397 in resilient contact with a cam 400 secured to the outer face of gear 300 (Fig. 3). It will thus be seen that cam face 282 is held in positive engagement with pin 281 while pawl 352 is restored by the spring 354 to the position shown in Fig. 3.

Shortly after the high point 378 of cam 377 moves past roller 376 and enables pawl 352 to be returned by the spring 354 to its normally ineffective position, the high point of cam 400 coacts with arm 399 to rock bellcrank 397 and lever 392 counterclockwise (Fig. 3), thus moving lever 392 to its normally ineffective position wherein tip 391 is unlatched and moved in front of extension 390 on lever 262 as shown in Fig. 3. It will be recalled that after lever 392 is thus released from engagement with lug 390, the rear upper end of connecting lever 270 is retained in operative engagement with pin 281 by a spring-urged latch, not shown, and that the connecting lever 270 is not restored to the full-cycle position shown in Fig. 2 until the automatic division operation has been completed.

We claim:

1. In a calculating machine having an automatic division mechanism, the combination which comprises an amount entering means for receiving a divisor factor, a register for receiving a dividend factor, mechanism for laterally shifting the said register in either direction relative to the said amount entering means, a positionable division control member, resilient means biasing said member to an inoperative position, manually operable means for moving said member to an operative position, means for latching said member in an operative position, mechanism controlled by said positionable member upon movement to its operative position for initiating operation of the said shifting mechanism to move the said register toward its rightmost end position, and power-operated mechanism operated by said shifting mechanism in attempted overtravel movement of the said register beyond its rightmost end position for releasing said latch and thereby terminating the said right shift operation, and means controlled by said member in its return to its inoperative position for initiating operation of the said automatic division mechanism.

2. In a calculating machine having a register for receiving a dividend factor, an amount entering means for receiving a divisor factor, and shifting means for laterally moving the said register relative to the said amount entering means, the combination with an automatic division mechanism of the successive subtraction type which comprises a positionable division control member normally biased to a first adjusted position, manually controlled means for moving said member to a second adjusted position, mechanism controlled by said member upon movement to its second adjusted position to initiate operation of the said shifting means to move the said carriage toward its rightmost end position, latching means for releasably holding the said division control member in the said second adjusted position, a normally ineffective power-operated mechanism for initiating operation of the automatic division mechanism, and control means operated by an overdrive of the register shifting means in the said rightmost end position of the register for releasing the said latching means, and means operated by said member in its return to its first position for rendering the said power-operated mechanism effective to initiate operation of the said automatic division mechanism.

3. In a calculating machine having a register for receiving a dividend factor, an amount entering means for receiving a divisor factor, and means for laterally shifting the said register relative to the said amount entering means, the combination with an automatic division mechanism of the subtractive type which comprises a settable division control member normally biased to a first adjusted position, manual means for moving said member to a second adjusted position, latching means for releasably holding the said settable member in the second adjusted position, mechanism controlled by the said settable member in its movement to its second adjusted position for initiating operation of the said shifting means to automatically move the said carriage toward its rightmost end position, control means operated by the said shifting means and operable after the carriage is thus moved to its rightmost end position for moving the said latching means to release the said settable member for return to its first adjusted position, and cam-actuated means conditioned for operation by the said settable member in its return to the said first adjusted position for positively initiating operation of the said automatic division mechanism.

4. In a calculating machine having a carriage, an accumulator for receiving a dividend factor in said carriage, a revolutions counter in the said carriage, an amount entering means for receiving a divisor factor, and means for laterally shifting the said carriage relative to the said amount entering means, the combination with an automatic division mechanism which comprises a settable division control member normally biased to a first adjusted position, manually controlled means for moving said member to a second adjusted position, latching means for releasably holding the said settable member in the second adjusted position, mechanism controlled by the said settable member in its movement to its said second adjusted position for initiating operation of the said shifting means to automatically move the said carriage toward its rightmost end position, control means operated by an overdrive of the said shifting means in the rightmost end position of the carriage for operating the said latching means to release the said settable member for return to its first adjusted position, a normally inoperative cam-actuated means for positively initiating operation of the said automatic division mechanism, means operated by said settable member in its return to its first adjusted position for rendering said cam-actuated means operative, a revolutions counter-control mechanism, means operable when the machine is in its full-cycle position for adjusting the said counter-control mechanism to selectively determine like or unlike registration in the said accumulator and revolutions counter, and means for positively locking the counter-control mechanism in a preselected one of the said adjusted positions during operation of the said machine.

5. In a calculating machine having a carriage, an accumulator in said carriage for receiving the dividend factor, an amount entering means for receiving a divisor factor, and power-operated means for laterally shifting the said carriage relative to the said amount entering means, the combination with an automatic division mechanism which comprises a settable division control member normally biased to a first position, manually operable means for moving said member to a second position, a latch for releasably holding the said settable member in the second position, mechanism operated by the said settable member in its movement from its first to its second position for initiating operation of the said shifting means to automatically move the said carriage toward its rightmost end position, mechanism operated by the said shifting means in attempted shifting of the said carriage beyond its rightmost end position for releasing the said latch and allowing the said settable member to return to its first position, a power-operated cam actuator, a cam-actuated pawl normally biased to an ineffective position beyond the range of the said cam actuator, means operated by the said settable member in its return to the said first position for positioning the said cam-actuated pawl within the effective range of the said actuator, and mechanism operated by the said actuator while the said pawl is thus positioned in its effective position for initiating operation of the said automatic division mechanism.

6. In a calculating machine provided with an automatic division mechanism including a normally disabled division initiating connecting lever, a keyboard on which the digits of a divisor may be set, and a laterally shiftable carriage having a register into which the digits of a dividend may be entered, the combination which comprises carriage shifting mechanism including a right shift clutch normally biased to open position and engageable for effecting shift of the said carriage toward the right relative to the said keyboard, means for driving the said carriage shifting mechanism including a main drive shaft and a cyclically operable clutch, an override pawl operated by the said shifting means during overdrive in attempted shifting of the said carriage beyond the rightmost end position of said carriage, a positionable division control slide, resilient means tending to urge the said slide to a first adjusted position, manually operable means for moving the said control slide to a second adjusted position, latching mechanism for releasably holding the said control slide in the said second adjusted position, mechanism operable by said slide in its movement from its first to its second adjusted position for engaging the said right shift clutch and enabling said driving means for the said carriage shifting mechanism so as to cause continuous shifting of the said carriage toward the right, means operated by said override pawl for releasing the said latching mechanism and enabling the said control slide to return to the said first adjusted position, a division initiating cam on the said drive shaft, a positionable member normally biased to a position outside the path of travel of said cam, means operated by the said control slide in its return to the said first adjusted position for moving said member into the path of travel of the said cam, and means operated by said member for enabling said connecting lever for initiating an automatic division operation.

7. In a calculating machine provided with an automatic division mechanism including a normally disabled division initiating connecting lever, a keyboard on which the digits of a divisor may be set, and a laterally shiftable carriage including a revolutions counter for entering the quotient and an accumulator into which the digits of a dividend may be entered, the combination which comprises carriage shifting mechanism including a right shift clutch normally biased to open position and engageable for effecting shift of the said carriage laterally toward the right relative to the said keyboard, means for driving the said carriage shifting mechanism including a main drive shaft and a cyclically operable clutch, an override pawl operated by the shifting means during overdrive in attempting to shift the said carriage beyond its rightmost end position, a positionable division control slide, resilient means tending to urge the said slide to a first adjusted position, manually operable means for moving the said control slide to a second adjusted position, latching mechanism for releasably holding the said control slide in the said second adjusted position, mechanism operated by the said control slide in its movement to its second adjusted position for engaging the right shift clutch and enabling said driving means for the said carriage shifting mechanism so as to cause continuous shifting of the said carriage toward the right, means operated by the said override pawl for releasing the said latching mechanism and enabling the said control slide to return to the said first adjusted position under the urgency of the said resilient means, a division initiating cam on the said drive shaft, a positionable member normally biased to ineffective position with respect to said cam, means operated by the said control slide in its return to the said first adjusted position for positioning said positionable member in an operative position with respect to said cam, means operated by said positionable member for enabling said connecting lever for initiating an automatic division operation, mechanism for restoring the said pawl to its normally ineffective position during the said automatic division operation, a revolutions counter-control mechanism, means operable while the machine is in full-cycle position for adjusting the said counter-control mechanism to selectively determine like or unlike registration in the said accumulator and revolutions counter, and means for positively locking the said counter-control mechanism in one preselected adjusted position as long as the said cyclically operable clutch remains engaged for determining operation of the said machine.

8. In a calculating machine having a register for receiving a dividend factor, a selection means for receiving a divisor factor, a positionable value entering mechanism for transmitting a value set in the selection means into the register, a revolutions counter, a revolutions counter control mechanism adjustable to determine like or unlike registration in the revolutions counter with respect to said register, manual means for adjusting said revolutions counter control mechanism to either its like or unlike position, shifting means for laterally moving the said register in either direction relative to the said selection means, and a drive means for said machine including a clutch and a clutch control member: the combination with an automatic division mechanism which comprises a positionable division control member normally biased to an inoperative position, manual means for moving said member to an operative position and for operating said clutch control member, means for latching said member in its operative position, means controlled by said member in its movement to its operative position for initiating operation of the said shifting means to move the said register toward its rightmost end position, means operated by the shifting means in attempted overtravel movement of the said register beyond its rightmost end position for releasing said latching means and for initiating operation of the said automatic division mechanism, and means operated by said clutch control member for locking the said counter control mechanism in either adjusted position.

GEORGE W. HOPKINS.
ELWOOD A. DAVIS.
GOTTFRIED ZICKLER.

References Cited in the file of this patent
UNITED STATES PATENTS

| Number | Name | Date |
|---|---|---|
| 2,365,325 | Avery | Dec. 19, 1944 |
| 2,365,507 | Allen | Dec. 19, 1944 |
| 2,366,345 | Machado | Jan. 2, 1945 |
| 2,399,917 | Friden | May 7, 1946 |
| 2,408,097 | Pott | Sept. 24, 1946 |
| 2,636,677 | Gang | Apr. 28, 1953 |